Dec. 30, 1969  D. R. JAMES  3,486,603
DRUPE ORIENTING APPARATUS

Filed Aug. 4, 1967  3 Sheets-Sheet 1

INVENTOR.
DONALD R. JAMES
BY
Paul A. Weilein
ATTORNEY

Dec. 30, 1969     D. R. JAMES     3,486,603
DRUPE ORIENTING APPARATUS

Filed Aug. 4, 1967     3 Sheets-Sheet 2

INVENTOR.
DONALD R. JAMES
BY
Paul A. Weilein
ATTORNEY

Dec. 30, 1969     D. R. JAMES     3,486,603
DRUPE ORIENTING APPARATUS
Filed Aug. 4, 1967     3 Sheets-Sheet 3
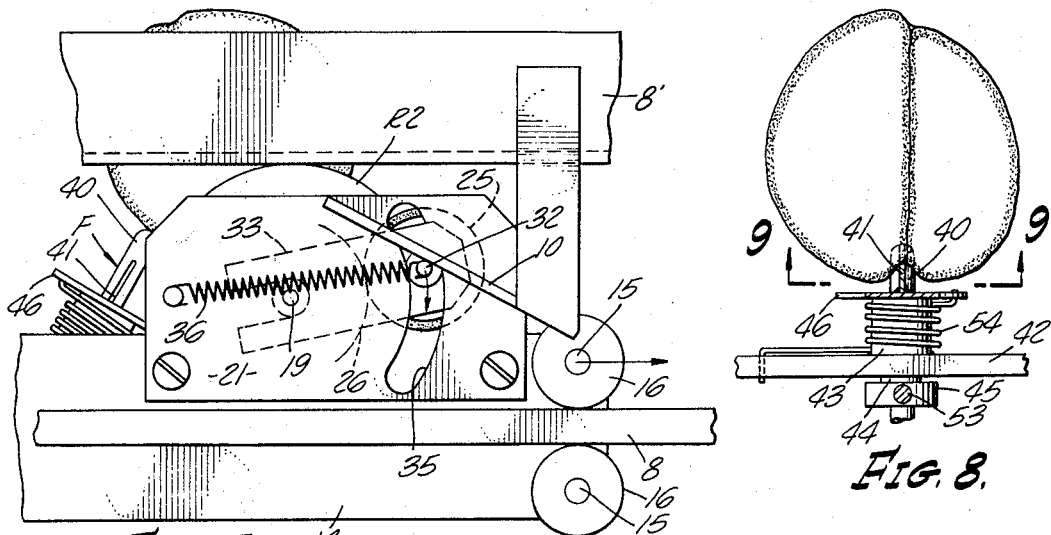
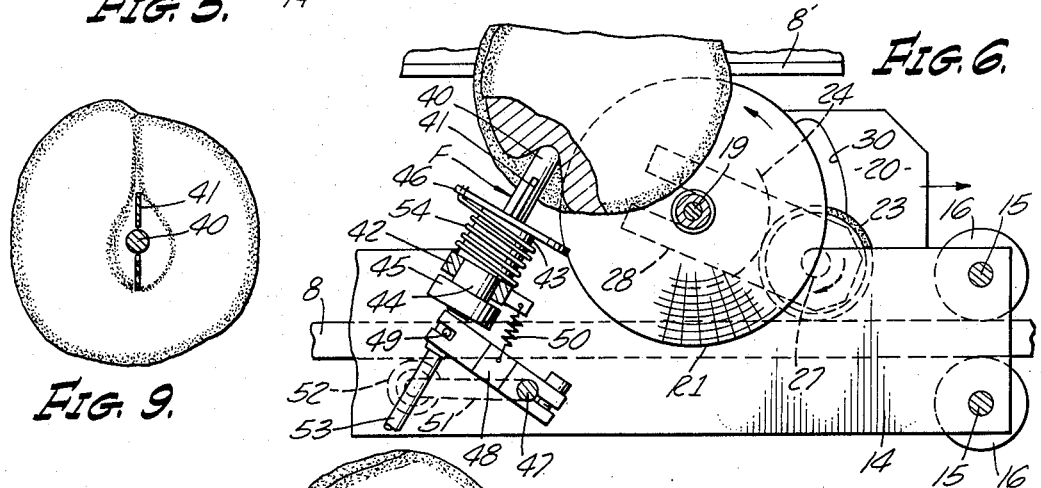
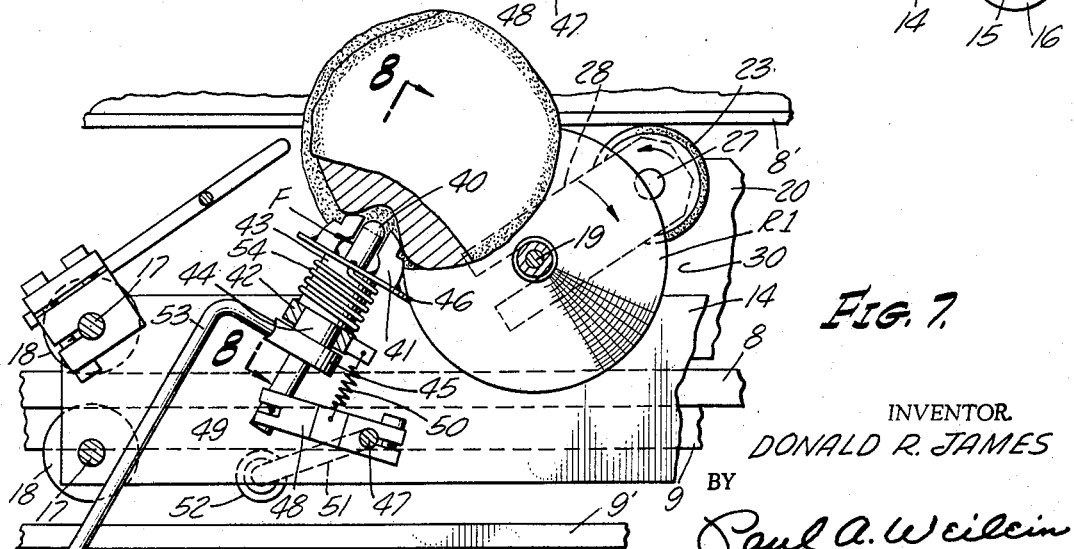
INVENTOR.
DONALD R. JAMES
BY
Paul A. Weilein
ATTORNEY

United States Patent Office 3,486,603
Patented Dec. 30, 1969

3,486,603
DRUPE ORIENTING APPARATUS
Donald R. James, Northridge, Calif., assignor to Brown International Corporation, Covina, Calif., a corporation of California
Filed Aug. 4, 1967, Ser. No. 658,548
Int. Cl. B65g 47/24
U.S. Cl. 198—33                                   10 Claims

ABSTRACT OF THE DISCLOSURE

Drupe orienting apparatus in which the drupe is supported on a locating pin and drupe rotating rotors substantially on three horizontally spaced points.

---

The present invention relates to apparatus for establishing a predetermined orientation of the suture plane of drupes, such as peaches and the like, as the drupes are supplied to the apparatus at a drupe receiving position and transported to a drupe discharging position, and more particularly to such an apparatus which is efficient in its operation so as to more effectively establish for each drupe the desired orientation to enable the drupe to be picked off at the drupe discharging position by apparatus for halving the drupe.

The present invention involves improvements in the apparatus of Wurgaft Patent No. 3,085,672 granted Apr. 16, 1963.

In the operation of prior drupe orienting devices, problems in efficiency of operation are encountered due to the variations in the size and shape of peaches or other drupes at different periods of the harvesting season and in different harvesting seasons. The present invention has for its principal object the provision of drupe orienting apparatus whereby the suture plane of the drupe is established and which is capable of handling drupes of a wide variety of sizes and shapes by virtue of the fact that the present invention provides individual fruit supporting means operable for effecting orientation of the individual fruit.

More particularly, an object of the invention is to provide a drupe support which essentially comprises elements which form three points of horizontally spaced support for the drupe, a pair of these supporting points being on drupe driving rotors which will, during movement of the support between drupe receiving and drupe discharging positions, effect such rotative movement of the drupe as to enable drupe stem cavity finding and orienting means to find the stem cavity of the drupe, arrest such rotative movement of the drupe, and then, if the drupe is not disposed with its suture plane in the desired orientation, engage the cavity, which is generally oblong in the plane of the suture, to turn the drupe on its stem axis to the desired orientation of the suture plane.

In accomplishing the foregoing, it is a further object to provide apparatus in which not only is the fruit rotated to enable the stem cavity finding means to find the stem cavity, but the drupe is rotated in alternate, opposite directions and about different axes to cause random movement of the drupe stem cavity until the drupe stem cavity is engaged by the cavity finding means.

Other objects and advantages of the invention will be hereinafter described or will become apparent to those skilled in the art, and the novel features of the invention will be defined in the appended claims.

In the accompanying drawings:

FIG. 5 is a fragmentary view in side elevation illustrating a portion of the drupe supporting carriage and frame structure for shifting the rotor drive means to effect rotor rotation in the other direction;

FIG. 6 is a fragmentary view in vertical section, as taken on the central plane of the carriage, showing certain of the parts in elevation and showing the stem cavity finding means engaged in the stem cavity of the drupe with the drupe in a random orientation;

FIG. 7 is a view generally corresponding to FIG. 6 but showing the cavity finding pin retracted from the stem cavity and the orienting key engaged in the stem cavity, and with the carriage disposed at a location in its path of travel at which oscillation of the key is effected;

FIG. 8 is a fragmentary detail view as taken on the plane of the line 8—8 of FIG. 7; and FIG. 9 is a view as taken on the line 9—9 of FIG. 8 and more particularly illustrating the drupe in end elevation with the key disposed in the stem cavity and co-planar with the suture plane of the drupe.

Like reference characters in the several views of the drawings and in the following description designate corresponding parts.

Figure 1:
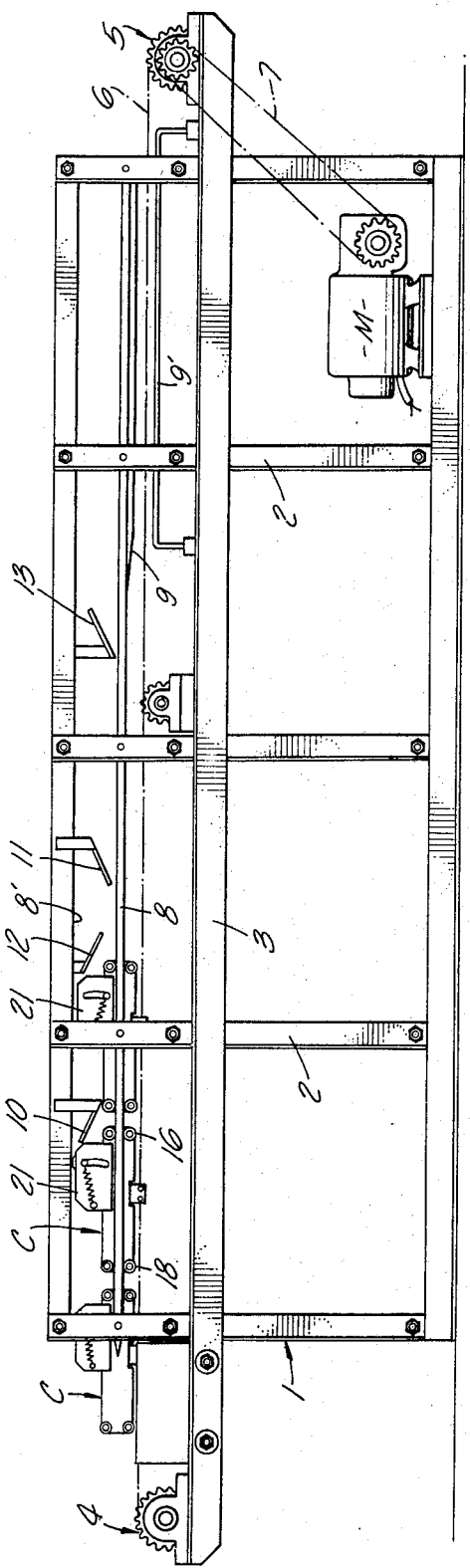
FIG. 1 is a view in side elevation illustrating drupe orienting apparatus made in accordance with the invention.
Figure 2:
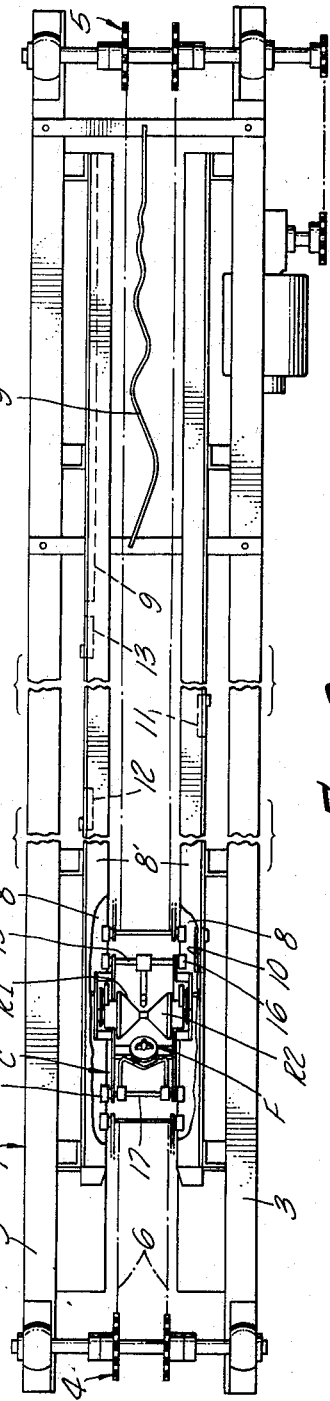
FIG. 2 is a top plan view with certain of the parts broken away to disclose a drupe supporting carriage.
Figure 3:
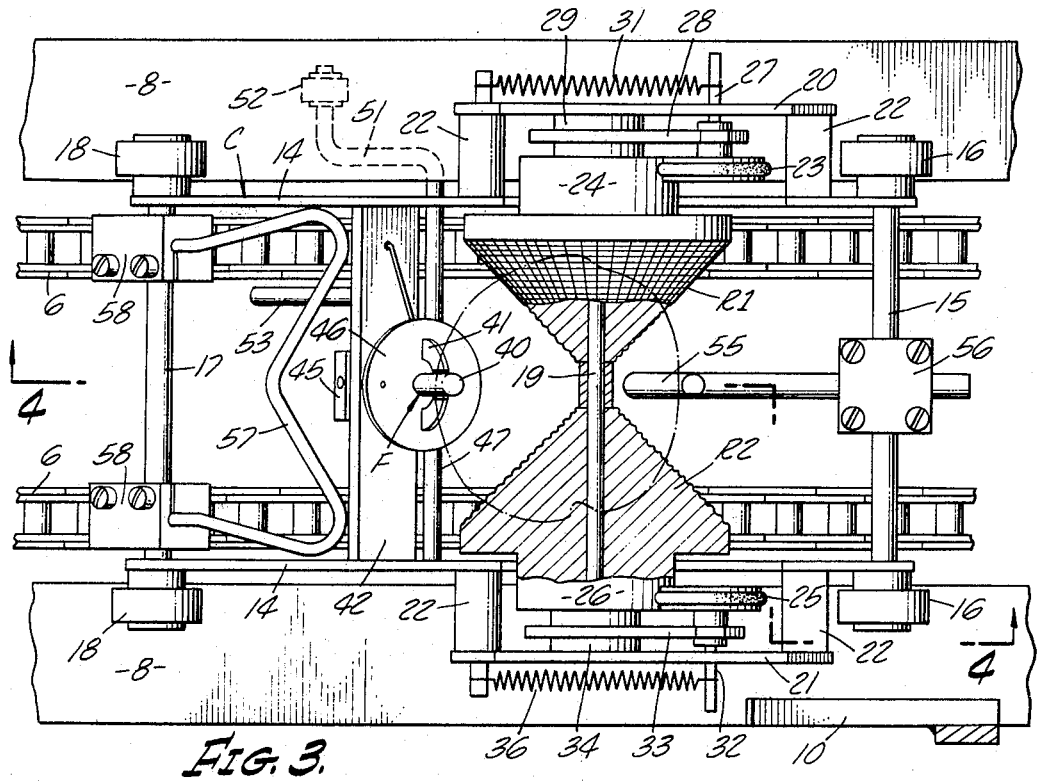
FIG. 3 is an enlarged fragmentary view partly in top plan and partly in horizontal section illustrating one of the drupe supporting carriages and the adjacent frame structure on which it is supported.

Referring to FIGS. 1 and 2, the apparatus comprises a frame structure 1 including suitable upright supports 2 and a horizontal support 3 at the opposite ends of which are mounted chain sprocket assemblies 4 and 5. Extended in an endless path about the sprocket assemblies 4 and 5 is a pair of chains 6. A motor M constituting a source of power is conveniently located on the frame structure and is drivingly connected to the sprocket assembly 5 by a drive chain 7 so as to effect clockwise drive of the chains 6. Connected to the chains 6 so as to move in an endless path therewith, is a plurality of similar carriage assemblies C which are adapted to be moved upwardly over the pulley assemblies 4 and moved with the upper run of the chains 6 toward the pulley assembly 5. In general, it will be understood that peaches or other drupes will be supplied by suitable means, not shown, to the successive carriages C adjacent the sprocket assembly 4 at a drupe receiving position and that the carriages will be moved progressively toward a drupe discharging position adjacent the sprocket assembly 5. At this drupe discharging position it is desired that the drupes be successively similarly oriented in respect of their suture plane so that they may be engaged by the drupe transfer mechanism of apparatus adapted to effect halving of the drupes. Accordingly, each of the carriages and the frame structure along the path of travel of the carriages are constructed so that each carriage will receive a drupe in random orientation and as the carriage progresses toward the discharge position the drupe will be oriented with the suture plane of the drupe disposed in a desired orientation to facilitate the engagement of the drupe at the discharge position by the transfer apparatus referred to above.

In order to support the carriages C for traverse of the frame structure, opposed side rails 8—8 are provided extended horizontally of the frame structure and, for purposes which will hereinafter appear, the frame structure is further provided beneath one of the side rails 8 with an elongated cam rail 9. The frame also includes longitudinally extended upper rails 8'—8' spaced above rails 8 and in longitudinally spaced relation above one of the rails 8 and depending from the superjacent rail 8' is a pair of cam bars 10 and 11 sloping in opposite directions, and above the other side rail 8 and depending from the other upper rail 8' a similar pair of sloping cam bars 12 and 13. In addition, beneath the level of the side rails 8 and centrally located therebetween, as best seen in FIG. 2, is an elongated undulate cam member 9' extended from a location longitudinally spaced forwardly of the end of cam 9 substantially to the discharge location.

Each of the carriages C is identical and is composed of a pair of side walls 14—14 having at the forward ends thereof a pair of vertically spaced transverse axles 15 which extend through the side walls and rotatively support at their opposite ends rollers 16, the rollers on the respective shafts engaging above and below the side rails 8 of the frame structure. Likewise, at the trailing ends of the side walls 14 of the carriage it is provided with a pair of vertically spaced axles 17 extending through the side walls 14 and mounting at their opposite ends rollers 18 which also engage above and below the side rails 8 of the frame structure so that the carriage is supported on the side rails for rolling movement therealong.

Each carriage is further provided with means for supporting a drupe and orienting the same. This means includes rotors R1 and R2 as well as drupe cavity finding and orienting means designated generally at F, whereby a drupe will be supported by engagement with the respective rotors R1 and R2 and the finding and orienting means at three locations. In order to support the rotors, a shaft 19 is provided and transversely extends across the carriage, the shaft being journalled at its opposite ends in a pair of similar support plates 20 and 21 mounted on the respective side walls 14 of the carriage in outwardly spaced relation thereto by spacers 22. The rotors R1 and R2 are respectively in the form of cones in the illustrative embodiment and are disposed on the shaft 19 with their apexes in adjacent relationship, the rotors thus being formed to center a drupe therebetween. For a purpose which will hereinafter more fully appear, the drupe engaging surfaces of the roller are preferably roughened as by the provision of cogs to enhance the driving coengagement of the cones with the drupe.

Means are provided for driving the rotors, and such means includes a rotary friction drive member 23 engaged with a cylindrical section 24 of the rotor R1 and a similar rotary friction drive element 25 engaged with a cylindrical and section 26 of the rotor R2.

Figure 4:
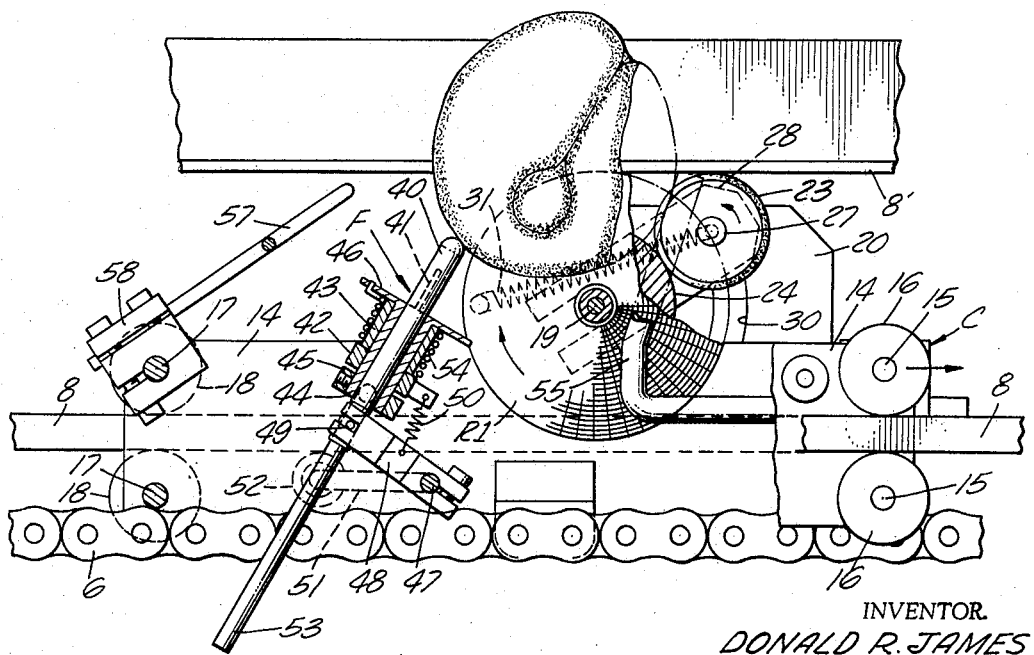
FIG. 4 is a view in vertical section as taken on the line 4—4 of FIG. 3 and showing the drive means for a rotor engaged to effect rotor rotation in one direction.

Drive element 23 for rotor R1 is supported on a shaft 27 carried at the free end of an arm 28, the other end of the arm being pivotally supported by a bushing 29 through which the rotor shaft 19 extends. The shaft 27 projects through the plate 20 in which is provided an elongate arcuate slot 30 so that the arm 28 may pivot between the position shown in FIG. 4 at which the rotary drive element is engaged with an upper rail 8' and a lower position shown in FIG. 6, at which the rotary drive element 23 is engaged with the side rail 8. A tension spring 31 is connected at one end to the shaft 27 and at its other end to a projection on the side plate 20 so as to normally spring load the rotary drive element 23 in its two positions, into engagement with either the upper rail 8' or the lower rail 8. Thus, it will be apparent that the direction of rotation of the rotor R1 will be dependent upon whether the rotary drive element is in engagement with the upper rail 8' or the lower rail 8, that is, when drive element 23 engages the upper rail 8' and the carriage is moving to the right, the drive element 23 will rotate counterclockwise, effecting drive of the rotor R1 in a clockwise direction; and when the drive element 23 is in engagement with the side rail 8 and the carriage C is moving to the right, the drive element 23 will rotate in a clockwise direction to cause rotation of the rotor R1 in a counterclockwise direction.

Similarly, the rotary drive element 25 for rotor R2 is mounted upon a shaft 32 which is supported at the free end of an arm 33, the latter being pivotally supported on a bushing 34 at its other end, and the shaft 32 extending through an elongate arcuate slot 35 in the side plate 21 so that a tension spring 36 connected to shaft 32 serves to urge the rotary drive element 25 into frictional engagement with either an upper rail 8' or a lower adjacent side rail 8 of the frame structure. Likewise, under these circumstances, the direction of rotation of rotor R2 will therefore be determined by whether the rotary drive element 25 is in engagement with the upper rail 8' or the lower rail 8. It will now be apparent that when rotary drive element 23 is in engagement with the upper rail 8' and the rotary drive element 25 is in engagement with the lower side rail 8, then movement of the carriage C to the right will cause opposite rotation of the respective rotors R1 and R2; i.e., rotor R1 will rotate clockwise and rotor R2 will rotate counterclockwise, whereby to impart rotative movement to a drupe engaged with the driving surfaces of the rotors about a vertical axis. In order to alternate the sense of rotation of the rotors R1 and R2 as the carriages C traverse the frame structure, the above described cam bars 10–13 are disposed for engagement with the outwardly projecting ends of the shafts 27 and 32 which support the respective rotary drive members. Thus, as seen in FIG. 1, when, due to right hand movement of a carriage the shaft 32 encounters the cam bar 10, the shaft 32 will be cammed downwardly to move the rotary drive element 25 out of engagement with the upper rail 8' and into engagement with the lower rail 8. Then, when the shaft 32 encounters the upwardly sloping cam bar 11, the shaft 32 will be cammed upwardly to again cause re-engagement of the rotary drive element 25 with the upper rail 8'. Likewise, it will now be understood that the outwardly projecting end portion of shaft 27 which supports rotary drive element 23 for rotor R1 will be, upon engagement with the cam bar 12, moved downwardly and upon engagement with the cam bar 13 moved upwardly so as to alternate the sense of rotation of rotor R1.

Thus, if both of the shafts 27 and 32 are in the upper positions so as to cause engagement of rotary drive elements 23 and 25 with the upper rail 8' as the carriage approaches the cam bar 10, both rotors R1 and R2 will be revolving in the same direction, i.e., in a clockwise direction so as to cause the drupe supported thereby and by the finding means F to rotate about an axis transverse of the path of travel of the carriage, that is, about a generally horizontal axis. However, upon downward movement of shaft 32 caused by engagement thereof with cam bar 10 with resultant engagement of rotary drive element 25 with side rail 8, the rotor R2 will then commence counterclockwise rotation so that the rotors will for a period of time rotate in opposite directions to cause rotation of the drupe supported thereby and by the finding means F about a vertical axis. Thereafter, when shaft 27 which supports rotary drive element 23 engages cam bar 12 and the rotary drive element 23 is therefore moved into engagement with the side rail 8, the rotors will again rotate together in the same direction but counter to the direction that they were initially rotating together, thereby causing reverse rotation of the drupe supported thereby and by the finding means F about an axis transverse to the carriage. Change of rotation is again accomplished when the shaft 32 of rotary drive element 25 encounters cam bar 11 to move rotary drive element 25 into engagement with the upper rail 8' at which time the rotor R2 will now rotate clockwise as the rotor R1 continues to rotate counterclockwise, thereby effecting opposite rotation of the drupe about a substantially vertical axis, until the shaft 27 encounters cam bar 13 and moves the rotary drive element 23 into engagement also with the upper rail 8', at which time rotation of the rotors in the same direction will again resume. It has been found that this just described alternate, opposite rotation about both a transverse and vertical axis efficiently causes the drupe stem cavity to move in a random manner until the finding means F enters the stem cavity of the fruit and upon such entry of the finding means the drupe will then be precluded from further rotation about an axis transverse to the suture plane of the drupe since the frictional coengagement between the drupe and the rotors, a function of the weight of the drupe, is ineffective to move the drupe off of the finding means which will now be more fully described.

The illustrative finding and orienting means F hereof is, like that of the aforementioned Wurgaft U.S. Patent No. 3,085,672, of the type employing a pin 40 and a key 41. The pin 40 is disposed at an angle leaning toward the rotors R1 and R2 so as to provide at its upper extremity the third point of drupe support, as referred to above. Means are provided for supporting the pin for longitudinal movement, and such means includes a transverse bar 42 extended between the side walls 14 of the carriage and on which is mounted, as by welding, a sleeve 43. Rotatably disposed within the sleeve 43 and extending through the bar 42 is a cylindrical member 44 having a central opening therethrough and through which the pin 40 extends, the member 44 being retained in place as by a stop collar 45. At its upper end the member 44 has an annular plate 46 on which the key 41 is provided and it will be noted that the pin 40 extends through an opening in the key.

Means are provided for effecting movement of the pin between a projected position in which the upper end of the pin extends through the key, and a retracted position (FIG. 7) in which the end of the pin is within the key. Such means includes a shaft 47 extended transversely between the side walls 14 of the carriage and mounting thereon a lever arm 48 which is operatively engaged as at 49 with the pin 40, whereby rocking of the shaft 47 in a counterclockwise direction will effect retraction of the pin 40. A tension spring 50 connected to the lever arm at one end and to the cross bar 42 at the other end resiliently biases the lever arm in a clockwise direction to cause projection of the pin 40. At one end of the shaft 47 it is provided with a crank arm 51 having a roller 52 which is engageable beneath the adjacent side rail 8 of the frame structure and which will engage the cam rail 9 previously referred to and best seen in FIGS. 1 and 7, so as to cause counterclockwise rotataion of shaft 47 and retraction of the pin 40 from the stem cavity of the drupe as the carriage approaches the discharge end of its path.

When the pin has been retracted the drupe will then be supported at this point on the key 41, the key being arched and elongated so as to extend into the normally elongate stem cavity of the drupe in a plane generally coincident with the suture plane of the drupe. As the carriage is moving toward its discharge position with the pin 40 retracted, means are provided for effecting oscillation of the key 41 so as to assist in the positioning of the key properly within the elongate stem cavity of the drupe, so that following oscillation of the key and its return to a normal position, the drupe will be disposed upon the key and moved thereby to a position at which its suture plane is disposed in the desired orientation. To this end the stop collar 45 which is mounted upon the cylindrical key supporting member 44 has at one side an outstanding lever arm 53 which projects downwardly through the carriage so as to engage the undulate cam 9' referred to above, the undulations of which progressively diminish in the direction of the travel of the carriage so as to cause diminishing oscillation of the key. A spring 54 coiled about the sleeve 43 on the cross bar 42 and engaged with the latter and with the plate 46 is provided for normally resiliently holding the key in the desired orientation and upon cessation of oscillation of the key this spring will function to move the drupe on the key to the oriented position at which it will be picked up from the carriage as the latter reaches the sprocket assembly 5.

In order to assure that drupes fed to the carriages and being moved by the carriage rotors and orienting means do not inadvertently fall from their three-point support, adjustable barrier means are provided including a forward barrier rod 55 mounted as at 56 on the upper forward axle 15 of the carriage. A trailing barrier is provided including a member 57 extended transversely adjacent the finding means F and mounted at its opposite ends as at 58 on the upper axle 17 of the carriage. Each of thesee barriers is preferably angularly adjustable so as to enable their being disposed at an advantageous location relative to the rotors and the finding means, respectively, as may be required to handle drupes of different size ranges encountered in different crops.

From the foregoing, it will be recognized that an efficient apparatus has been provided for assuring rotation of a drupe in various directions so as to assure that the finding means will find the stem cavity of the drupe while the drupe is supported on elements which must cooperate only with the drupe supported thereby at the three points of contact which are disposed substantially on a horizontal plane, and while the apparatus has been herein illustrated as including frame structure and endless chain mechanism for causing the carriages to travel in a horizontal path, the structure is merely illustrative of means for causing the carriages to traverse a path between a drupe receiving and a drupe discharging position. Therefore, it would be within the purview of the invention to provide a frame structure which will direct the individual drupe carriages in other than a horizontal path as may be desired for efficiency of drupe handling and space conservation in relation to the means for supplying drupes to the apparatus, as well as for picking drupes from the apparatus after the drupes have been oriented.

What is claimed is:

1. In an apparatus for orienting the suture plane of a drupe, the combination of:
   a first support means shaped and dimensioned to enter and engage the stem cavity of the drupe;
   two rotary support means cooperative with the first support means to support the drupe at three points thereof;
   means to move said three support means in unison along a path of conveyance thereby to convey the drupe;
   fixed means extending along the path of conveyance;
   two rotary actuators operatively connected to the two rotary support means respectively for engagement with said fixed means to actuate the two rotary support means in response to the travel along said path to rotate the drupe about a plurality of axes in succession until the stem cavity of the drupe is brought into engagement with the first support means;
   said fixed means comprising a plurality of fixed means extending in directions parallel to said path;
   each of said rotary actuators being shiftable in one direction to one position against one of the fixed means to rotate the corresponding rotary support means in one rotary direction and being shiftable in the opposite direction to a second position against another of the fixed means for rotation of the corresponding rotary support means in the opposite rotary direction; and means for shifting said rotary actuators.

2. A combination as set forth in claim 1 in which each of said rotary actuators is shiftable with snap action between its two positions;
   and which includes fixed cam means along said path to cam the rotary actuator from one of its two positions to the other position in response to movement of the three support means along said path.

3. A combination as set forth in claim 2 which includes a plurality of cam means along the path of conveyance cooperative with each of said two rotary actuators to shift each of the rotary actuators to its two positions alternately.

4. A combination as set forth in claim 3 in which said cam means are distributed and positioned to actuate the two rotary support means in four stages in succession, the two rotors rotating simultaneously in one rotary direction in one of the stages, the two rotors rotating simultaneously in the opposite direction during another one of the stages, one rotor rotating in the one direction and the other rotor rotating in the opposite direction during a third of the four stages, the one rotor rotating in the opposite direction and the other rotating in said one direction in another of the four stages.

5. A combination as set forth in claim 1 in which said first support means includes a key member of elongated cross section to engage the drupe stem cavity longitudinally thereof to place the suture plane of the drupe in the plane of the key member;

and which includes means to oscillate the key member in response to travel of the three support means along said path.

6. A combination as set forth in claim 5 in which said means to oscillate the key member includes fixed cam means along said path.

7. A combination as set forth in claim 5 which includes a pin centrally of said key member biased to extend beyond the key member;

and which includes means to retract the pin relative to the key member in response to travel of the three support means along said path.

8. A combination as set forth in claim 7 in which said means to retract the pin includes fixed cam means along said path.

9. A combination as set forth in claim 1 which includes barrier means cooperative with the three support means to keep the drupe in position for support by the three support means.

10. A combination as set forth in claim 9 in which said barrier means includes fore and aft barrier means respectively.

References Cited

UNITED STATES PATENTS

| | | | |
|---|---|---|---|
| 2,933,174 | 4/1960 | Hait | 198—33 |
| 3,085,672 | 4/1963 | Wurgaft | 198—33 |
| 2,909,270 | 10/1959 | Hait. | |

RICHARD E. AEGERTER, Primary Examiner